Oct. 28, 1924.  
H. W. BAMBER  
1,513,528  
PRODUCER GAS SCRUBBER  
Filed March 21, 1924

Inventor  
Herbert W. Bamber  
by Wilkinson & Fisher  
Attorneys.

Patented Oct. 28, 1924.

1,513,528

UNITED STATES PATENT OFFICE.

HERBERT WILLIAM BAMBER, OF LONDON, ENGLAND.

PRODUCER-GAS SCRUBBER.

Application filed March 21, 1924. Serial No. 700,929.

*To all whom it may concern:*

Be it known that I, HERBERT WILLIAM BAMBER, a subject of the King of Great Britain, and a resident of London, England, have invented certain new and useful Improvements in Producer-Gas Scrubbers, of which the following is a specification.

In automobiles using producer gas as the power supply considerable difficulty is experienced in ridding the gas of dust and other impurities preparatory to its admission to the engine and generally scrubbers used for this purpose are not only charged with filtering or cleansing material such as coke but are very often supplied with a spray of water for the purpose of arresting dirt, and cooling the gas before use.

The object of the present invention is to so construct a scrubber that no water is required but a sufficient cooling effect is obtained by exterior air-cooling, the interior of the scrubber hereinafter described may be charged with coke or other filling material although such a medium is not necessary and the purification of the gas is effected in a dry state, that is to say without any spray of water.

One of the difficulties to overcome with the use of a dry scrubber is due to the varying conditions or velocity of the gas coming from the generator which is necessarily governed by the speed of the engine to be supplied.

A scrubber constructed according to the present invention comprises a vertically disposed cylindrical receptacle the lower portion of which is somewhat larger in diameter than the upper, the upper part being formed with a circular jacket or annular space wherein the gas partly cleansed in the bottom and central portion of the receptacle is discharged, preparatory to its admission into the engine. The base of the receptacle is preferably made conical to facilitate the collection of the dust and dirt from the gas which is admitted at or near the bottom and rises in the interior to the upper part of the receptacle where it is admitted into the annular space aforesaid.

The annular space at the top of the receptacle is of a singular character or is divided into two or more segmental but continuous courses within which the gas travels, the continuous course being interrupted by depending tubes which form baffles that obstruct the course of the dust particles and afford means for precipitating the same. These depending tubes pass through the bottom chamber and are provided with plugs exterior thereof to facilitate the removal of the dirt collected therein.

Immediately adjacent to the inlet opening that establishes communication between the central chamber and the annular space is provided the outlet branch for the cleansed gas which is situated tangentially to and at or near the top of the upper part of the receptacle. The receptacle is provided with a cover plate on the removal of which the whole of the interior can be cleansed.

The conical base of the receptacle is provided with an orifice and plug to facilitate the removal of the dust collected therein.

In order that the invention may be clearly understood reference may now be had to the accompanying sheet of drawing in which—

Figure 1:
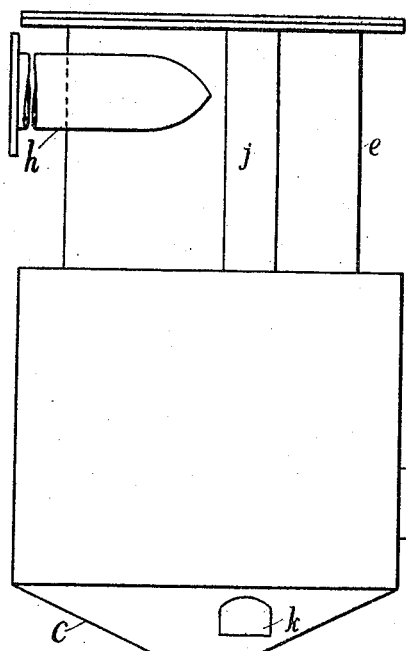
Figure 1 is an elevation of a gas scrubber constructed in accordance therewith.
Figure 2:
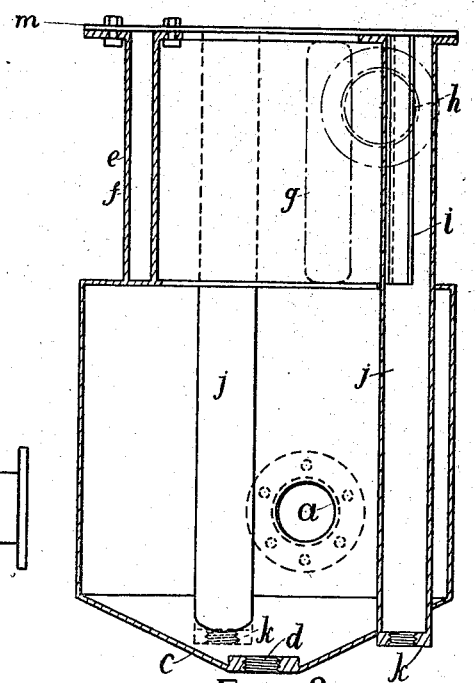
Figure 2 is a vertical section taken on line $x\ x$ of Figure 3.
Figure 3:
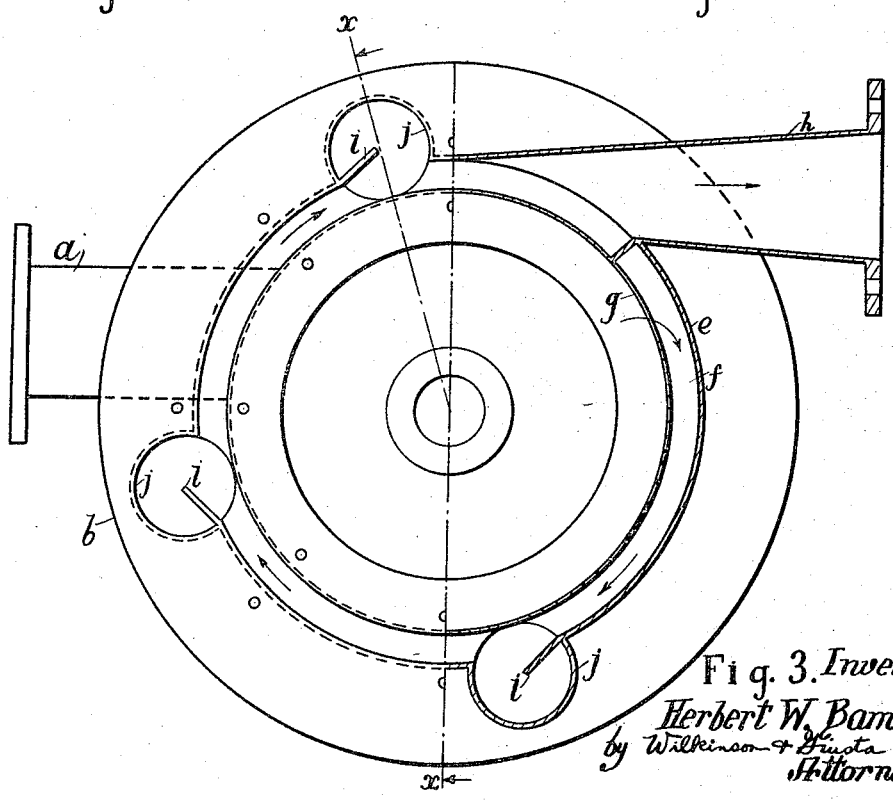
Figure 3 is a plan view to an enlarged scale the left hand half with cover plate removed and the right hand half a horizontal section through the upper part of the scrubber.

Referring now to the drawing it will be seen that the gas to be cleansed is admitted by the branch $a$ into the lower part of the receptacle $b$ which is provided with the conical base $c$ and the central orifice $d$ which may be closed by a plug or cap as may be desired. The upper part $e$ of the receptacle $b$ is formed as an annular passage $f$ the admission of the gas thereinto taking place through the orifice $g$ as indicated by the arrows in Figure 3.

As will be observed the annular space $f$ extends practically around the upper part $e$ of the receptacle terminating in the exit branch $h$ which is disposed tangentially to the passage $f$. Intermediately in its course around the passage $f$ the gas is more or less deflected by the baffles $i$ within the depending tubes $j$ wherein the dust and dirt particles are arrested in their course and precipitated or deposited in the lower ends of the tubes $j$ which pass through the lower part $b$ of the receptacle their ends $k$ being closed by suitable removable plugs or caps to facilitate the removal of the accumulation of dust and dirt. The upper part $e$ of the receptacle is enclosed by the cover plate $m$.

It will be understood that a producer gas scrubber constructed as above described will very effectively deal with a wide range of velocities of incoming gas from the generator which necessarily vary according to the speed of the engine to be supplied and the cleansing effect will be materially increased in the receptacle $b$ of the scrubber when the engine speed is reduced and consequently the velocity of the gas whilst the cleansing effect will be increased in the receptacle $e$ when the engine is accelerated and consequently the velocity of the gas is increased.

What I claim is:

1. A producer gas scrubber for automobiles comprising a vertically disposed cylindrical receptacle into the lower part of which the gas to be cleansed is led and travels therefrom into the upper part which is formed as an annular passage provided with depending baffles that terminate in tubes which pass through the lower part of said receptacle to the exterior thereof from whence accumulated dirt and dust may be removed, the cleansed gas passing completely round said annular passage to a tangentially disposed outlet provided at the top thereof substantially as described.

2. A producer gas scrubber for automobiles comprising a lower cylindrical receptacle upon which is mounted an upper annular conduit within the course of which are provided baffles that terminate in depending tubes the ends of which are each closed by a removable cap to facilitate ridding said tubes of accumulated dust and dirt, the lower part of the receptacle being provided with an inlet branch for admission of the gas to be cleansed and the upper part with a tangentially disposed outlet branch for the cleansed gas to escape.

In testimony whereof I affix my signature.

HERBERT WILLIAM BAMBER.